US008214760B2

(12) United States Patent
Matthews et al.

(10) Patent No.: US 8,214,760 B2
(45) Date of Patent: Jul. 3, 2012

(54) WINDOW MINIMIZATION TRIGGER

(75) Inventors: David A. Matthews, Redmond, WA (US); Song Zou, Issaquah, WA (US); Bret P. Anderson, Puyallup, WA (US); Jared C. Simpson, Redmond, WA (US); Pai-Hung Chen, Redmond, WA (US); Patrice L. Miner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 817 days.

(21) Appl. No.: 12/015,123

(22) Filed: Jan. 16, 2008

(65) Prior Publication Data
US 2009/0183107 A1    Jul. 16, 2009

(51) Int. Cl.
*G06F 3/048* (2006.01)

(52) U.S. Cl. .................. 715/795; 715/796; 715/802

(58) Field of Classification Search ............ 715/700, 715/715–718, 863, 762–763, 764–809
See application file for complete search history.

(56) References Cited

U.S. PATENT DOCUMENTS

| | | | | |
|---|---|---|---|---|
| 5,499,334 | A * | 3/1996 | Staab | 715/778 |
| 5,786,818 | A * | 7/1998 | Brewer et al. | 715/822 |
| 5,917,483 | A | 6/1999 | Duncan et al. | |
| 5,920,315 | A | 7/1999 | Santos-Gomez | |
| 6,873,344 | B2 * | 3/2005 | Samra et al. | 715/723 |
| 6,957,395 | B1 | 10/2005 | Jobs et al. | |
| 7,007,241 | B2 * | 2/2006 | Boeuf | 715/802 |
| 2002/0140707 | A1 * | 10/2002 | Samra et al. | 345/619 |
| 2004/0261037 | A1 * | 12/2004 | Ording et al. | 715/788 |
| 2005/0149879 | A1 * | 7/2005 | Jobs et al. | 715/796 |
| 2005/0204306 | A1 | 9/2005 | Kawahara et al. | |
| 2006/0075359 | A1 | 4/2006 | Bauchot et al. | |
| 2006/0248471 | A1 | 11/2006 | Lindsay et al. | |
| 2007/0022389 | A1 | 1/2007 | Ording et al. | |
| 2007/0180398 | A1 | 8/2007 | McArdle | |
| 2007/0226647 | A1 | 9/2007 | Louch | |
| 2008/0177522 | A1 * | 7/2008 | Bolding et al. | 703/13 |

OTHER PUBLICATIONS

Dictionary Definitions. Farlex Inc. http://thefreedictionary.com retrieved Aug. 29, 2011.*
Maxmonkey Software 2,49, AllWorldSoft.com, pp. 1-3, Feb. 10, 2006; http://www.allworldsoft.com/software/17-339-maxmonkey.htm.
Fingerworks, XWinder The Future of Window Management, 6 pages, http://www.fingerworks.com/XWinder.html.
Ultramouse User Guide, 8 pages, Mouse Tool—Mouse software, http://www.fadsoft.net/mouse_help.htm.
Les Smith, Close All Windows but the Current Window in the Visual Studio.NET IDE, http://www.knowdotnet.com/articles/closeallbutcurrentwindow.html.

* cited by examiner

*Primary Examiner* — Weilun Lo
*Assistant Examiner* — Amy M Levy
(74) *Attorney, Agent, or Firm* — Shook, Hardy & Bacon L.L.P.

(57) ABSTRACT

A method and computer-storage media for minimizing application windows based on a triggering event are provided. Embodiments of the present invention include determining that a triggering event has occurred with respect to a target window, automatically minimizing all of the minimizable application windows except the target application window, and generating an undo record that may be used to restore the minimized windows upon the determination that a second triggering event has occurred with respect to the target window. In one embodiment, the triggering event is shaking the target application window.

15 Claims, 8 Drawing Sheets

US 8,214,760 B2

WINDOW MINIMIZATION TRIGGER

BACKGROUND

Many computers use operating systems and applications that provide displays containing multiple application windows. A user may move an application window, close an application window, minimize an application window, maximize an application window or readjust the size of an application window. A feature in Microsoft's WINDOWS operating system allows a user to minimize all of the application windows at once by pushing the "show desktop button."

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to a method of managing multiple application windows. In one embodiment, the user may minimize all but a target application window by shaking the target application window. Shaking an application window is performed by moving or dragging the application window back and forth several times. Once an application window is shaken all other open application windows presently capable of being minimized are minimized. An undo record may be created that allows the users to restore all of the minimized application windows by shaking the target application window a second time.

BRIEF DESCRIPTION OF THE DRAWINGS

The present invention is described in detail below with reference to the attached drawing figures, wherein.

DETAILED DESCRIPTION

Figure 1:
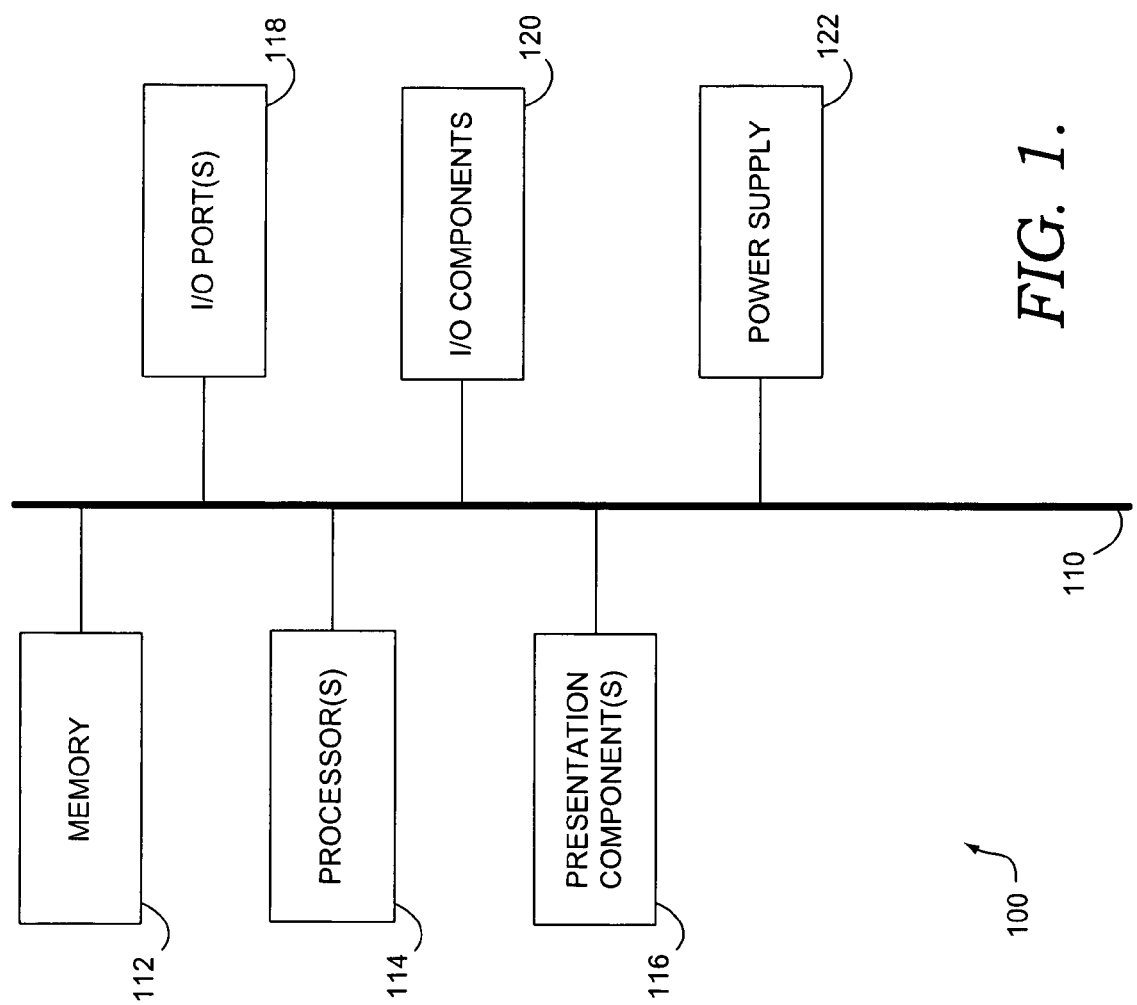
FIG. 1 is a block diagram of an exemplary computing environment that is suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in one embodiment, the present invention relates a method in a computer system having a display device and an input device for minimizing one or more application windows displayed on the display device in response to a triggering event. The method includes displaying on the display device two or more application windows and determining that the triggering event was performed by the input device with respect to a first application window. The method also includes, incident to said determining, minimizing all of the two or more application windows that are minimizable except for the first application window. Thus, the first application window remains displayed on the display device. A minimizable application window is any application window that is presently capable of being minimized. The method further includes creating an undo record that records one or more display characteristics of the two or more application windows when the all of said two or more application windows that are minimizable are minimized.

In another embodiment, the present invention relates to one or more computer-storage media having computer-executable instructions embodied thereon for performing a method of managing application windows. The method includes determining that a first application window has been shaken a first time. The first application window is shaken when the first application window receives greater than a threshold number of single shakes, wherein a single shake occurs when the first application window is moved a first direction a threshold distance and then moved in a second direction the threshold distance. The method also includes causing all minimizable application windows, except the first application window, to be minimized. A minimizable application window is capable of minimization when the first application window is shaken.

In yet another embodiment, the present invention relates to one or more computer-storage media having computer-executable instruction embodied thereon for performing a method of managing application windows. The method includes determining that a first application window has been shaken a first time. The first application window is shaken when the first application window receives greater than a threshold number of single shakes, wherein a single shake occurs when the first application window is moved a first direction a threshold distance at greater than a threshold velocity and then moved in a second direction the threshold distance at greater than the threshold velocity. The method also includes causing each minimizable application window on a display device except the first application window to be minimized and, upon determining that the first application window is shaken the first time, creating an undo record that records one or more display characteristics for open application windows when the first application window is shaken. The method further includes determining that the first application window has been shaken a second time and causing the open application windows to be displayed according to the one or more display characteristics captured in the undo record.

Having briefly described an overview of embodiments of the present invention, an exemplary operating environment suitable for use in implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
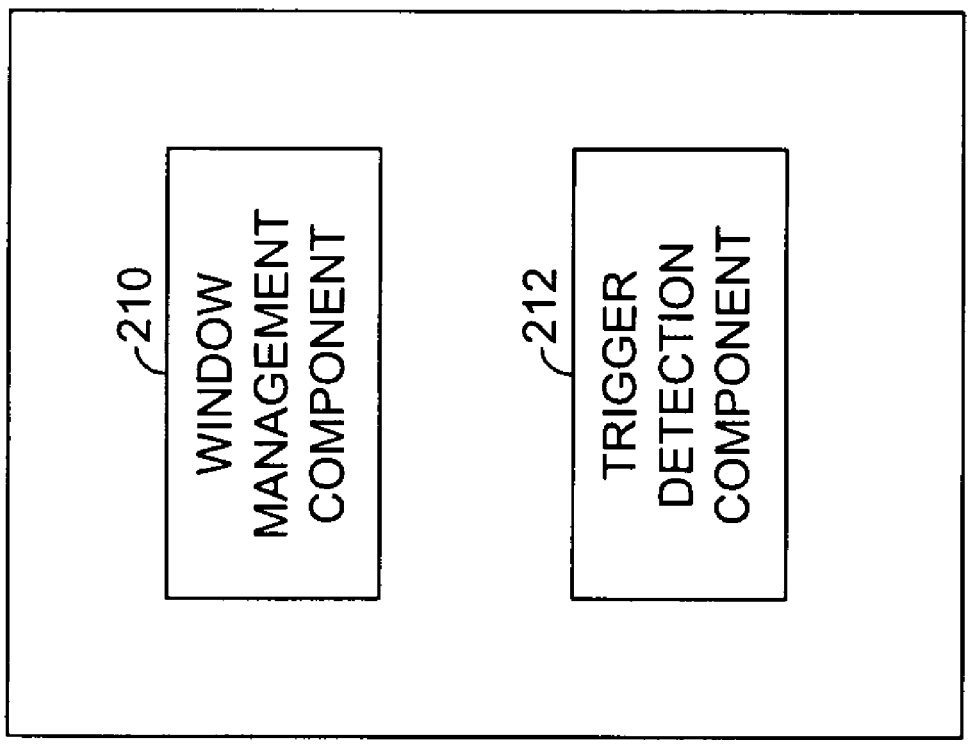
FIG. 2 is a block diagram of an exemplary computing system architecture suitable for use in implementing embodiments of the present invention.

Turning now to FIG. 2, a block diagram is illustrated that shows an exemplary computing system architecture 200 suitable for managing multiple application windows, in accordance with an embodiment of the present invention. It will be understood and appreciated by those of ordinary skill in the art that the computing system architecture 200 shown in FIG. 2 is merely an example of one suitable computing system architecture and is not intended to suggest any limitation as to the scope of the use or functionality of the present invention. Neither should the computing system architecture 200 be interpreted as having any dependency or requirement related to any single component/module or combination of component/modules illustrated therein.

Computing system architecture 200 includes window management component 210, and trigger detection component 212. Computing system architecture 200 may include a single computing device, such as computing device 100 shown in FIG. 1. In the alternative, computing system architecture 200 may include distributed computing environment that includes multiple computing devices coupled with one another via one or more networks. Such networks may include, without limitation, one or more local area networks (LANs) and/or one or more wide area networks (WANs). Such network environments are commonplace in offices, enterprise/wide computer networks, intranets, and the Internet. Accordingly, the network, or combination of networks, is not further described herein.

Window management component 210 is configured to manage application windows. Managing application windows includes the capability of closing, opening, restoring, minimizing, or maximizing application windows. The window management component 210 may also generate messages describing an application windows location on the screen. These messages will be referred to as "window movement messages" throughout this specification. These messages may be accessed by other components. The window management component may also be configured to manipulate the application windows in response to messages received by other components including the trigger detection component 212.

Trigger detection component 212 is configured to detect a triggering event, and to generate messages in response to the detection that instruct the window management component 210 to take action with respect to one or more application windows. In one embodiment, the triggering event is a shake. In general, a shake occurs when a user drags a target application window back and forth. A window may be dragged by moving the pointer to the target window's title bar, activating the selection function on the pointing device, and moving the pointing device without deactivation of the selection function. For example, if the pointing device is a mouse, the user would move the pointer to the title bar, press and hold the left mouse button, and move the mouse. Other pointing devices such as a track pad, a touch screen, a trackball, a graphics tablet with stylus, a light pen, a space ball and a pointing stick may be used in embodiments of the present invention.

The shake determination can be made by evaluating the movement of a target application window. Characteristics of movement that may be evaluated include the distance traveled by the target window, the target window's direction, the target window's velocity, the target window's change in direction, and the time the target window is at rest. The trigger detection component 212 may calculated these movement characteristics using information received in window movement messages generated by the window management component 210. The window movement messages may contain the window position at a point in time. In one embodiment, the trigger detection component 212 hooks the window movement messages that are generated and transmitted by the window management component 210.

In one embodiment, the trigger detection component 212 determines that the target window is shaken when the movement characteristics show that the target window has received greater than a threshold number of single shakes. A single shake may occur when the window is moved at a threshold velocity for a threshold distance and then moved in approximately the opposite direction at the threshold velocity for the threshold distance. As stated previously, the shake determination may require above a threshold number single shakes to occur within a threshold period of time for an affirmative shake determination to be made. In one embodiment, the threshold number of single shakes set at three, the threshold distance is between 1 and 2000 pixels, the threshold velocity is 600 pixels per second, and the threshold time period is 250 ms. The threshold values listed above are merely examples of suitable threshold values. Other threshold values may work equally well to distinguish between intentional triggering events and incidental actions taken by a user. In one embodiment, the threshold values may be changed by a user through a user interface.

Upon making an affirmative shake determination, the trigger detection component 212 may send a message to window management component 210 instructing the window management component to minimize all minimizable application windows other than the target window. A minimizable application window is any application window that is capable of being minimized at the time the triggering event is detected. Some application windows may not be minimized at any time. For example, some popup windows do not have the capability to be minimized. Other application windows are generally minimizable, but may not be minimized in certain situations. For example, a window displaying a Microsoft WORD document may normally be minimized, however, a window displaying a Microsoft WORD document may not be minimized when the save as dialogue box is displayed for that document. The trigger detection component 212 may be preconfigured or user configured to designate certain application windows as non-minimizable even though they are functionally capable of being minimized at the time the trigger event is detected.

When minimizing the minimizable application windows, the window management component 210 may also be instructed to create an undo record that records the display characteristics of each application window displayed when the application windows are minimized. The undo record may be used to restore the application windows to the setup they were in at the time the application windows were minimized. Examples of display characteristics saved in the undo record include the Z-order of the application windows, the size of the application windows, and the location of the application windows. The undo record may be held in active memory or written to a file.

The trigger detection component 212, is also configured to undo the minimization event upon detecting a second triggering event relative to the target application window. In one embodiment, the second trigger event must be separated from the first trigger event by a second triggering event threshold time period. The purpose of the second triggering event threshold is to distinguish between when a second triggering event is intended and when the first triggering event is ongoing. In one embodiment the same triggering event determination is used with the first and second triggering event. The shake may be the triggering event in both the first and second instance. Upon determining that the second triggering event has occurred, the previously minimized windows are restored to the arrangement present when they were first minimized. In one embodiment, the undo function is not activated if an invalidation event occurs between the first and the second triggering event. Examples of invalidation events include opening a new application window or minimizing the target window between the first triggering event and the second triggering event.

Figure 3:
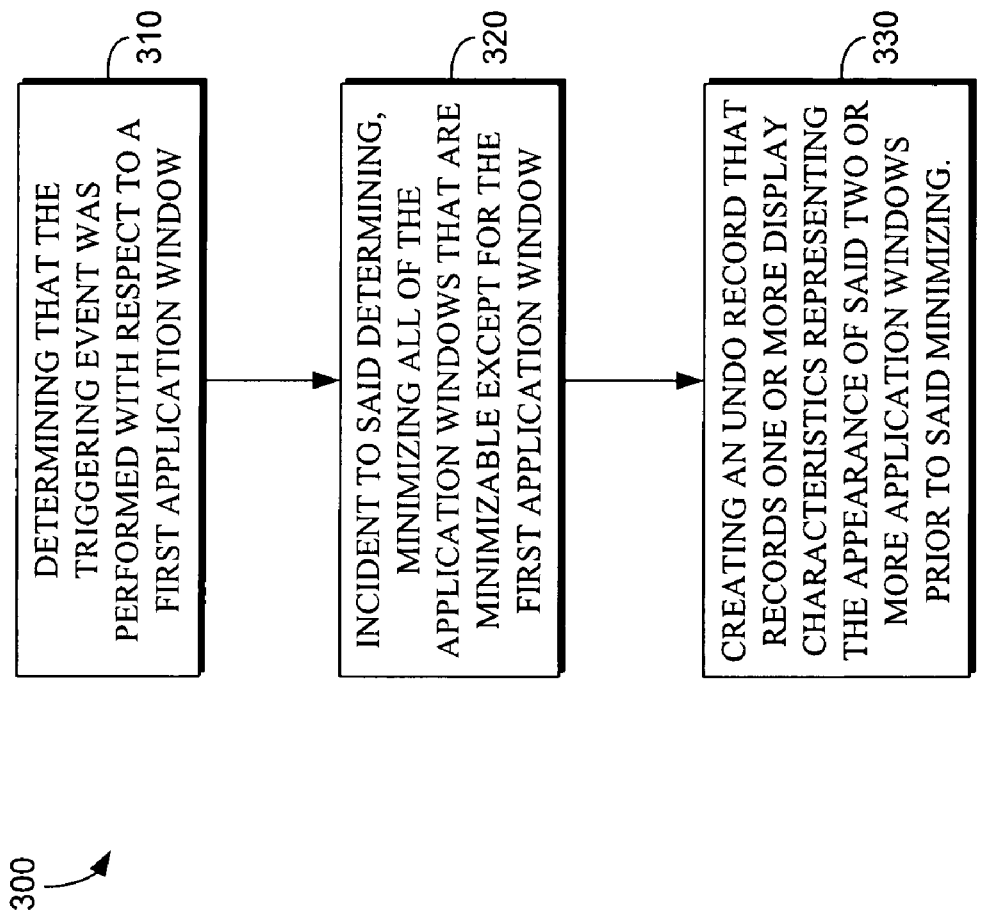
FIG. 3 is a flow diagram illustrating an exemplary method for minimizing one or more application windows displayed on the display device in response to a triggering event, in accordance with an embodiment of the present invention.

Referring next to FIG. 3, a flow diagram showing an exemplary method for minimizing one or more application windows displayed on a display device in response to a triggering event is illustrated and designated generally as reference numeral 300. At step 310, it is determined that a triggering event was performed by the input device with respect to a first application window. As stated previously, examples of triggering devices suitable for performing the triggering event include a track pad, a touch screen, a trackball, a graphics tablet with stylus, a light pen, a space ball and a pointing stick. In one embodiment, a triggering event is shaking the first application window.

Incident to determining that the triggering event was performed, at step 320, all of the application windows that are minimizable, except for the first application window, are minimized. Thus, the first application window will remain displayed on the display device and all minimizable application windows will be minimized. A minimizable application window is any application window that is presently capable of being minimized. The minimizable status of an application window may change based on the occurrence of events involving the application associated with the application window. For example, normally an application window associated with Microsoft WORD is minimizable. However, when the save dialog box has been activated the window associated with Microsoft WORD is not minimizable. Other application windows are never minimizable.

At step 330, an undo record is created that records one or more display characteristics for open application windows prior to the detection of the triggering event. The undo record may be used to restore the open application windows to an arrangement consistent with their arrangement at the time when the open application windows were minimized. In one embodiment, the application windows are restored when a second triggering event associated with the first application window is detected. Intervening actions by the user between the first triggering event and the second triggering event may invalidate the second triggering event and preclude the restoration of the minimized application windows. For example, if a user maximizes an application window that is minimized in response to the first triggering event, then the undo record may be deleted and the restoration option precluded. Similarly, if the user opens a new application window after the first triggering event, then the restoration of the previously minimized windows will not occur upon the performance of a second triggering event.

Figure 4:
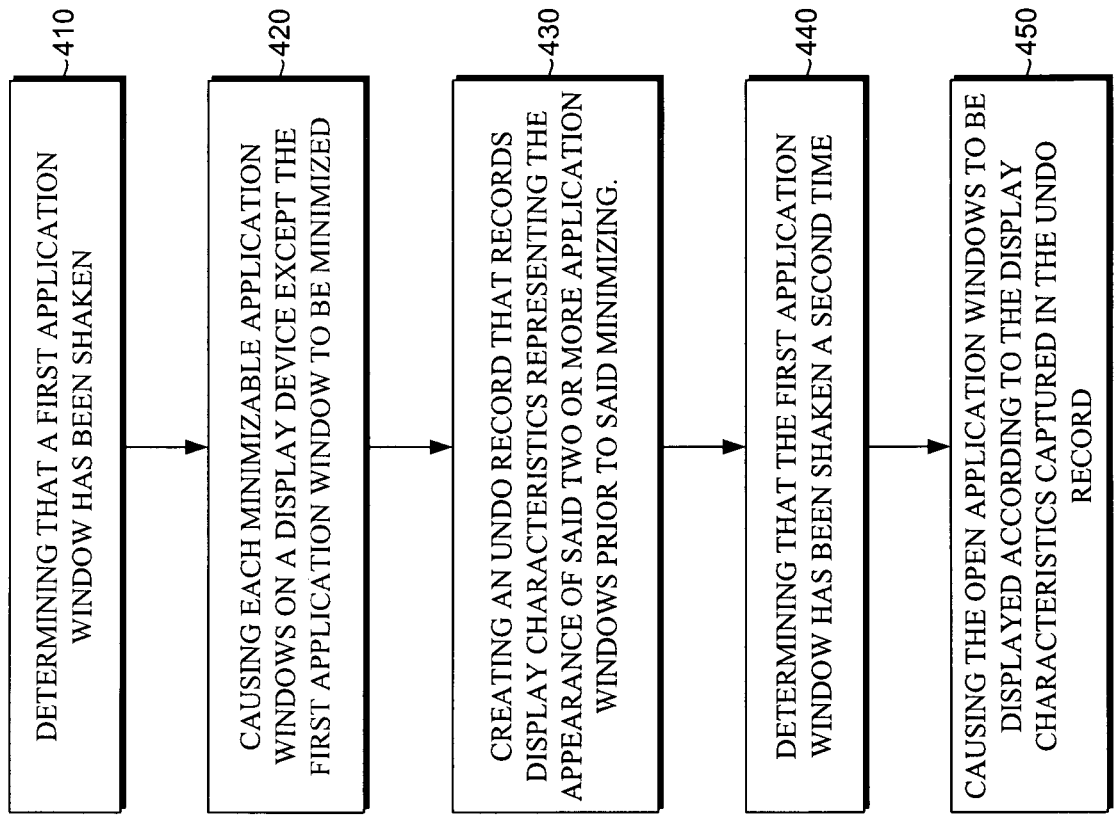
FIG. 4 is flow diagram illustrating an exemplary method for managing application windows, in accordance with an embodiment of the present invention.

Referring next to FIG. 4, a flow diagram showing an exemplary method for managing application windows is shown, and designated generally as reference numeral 400. At step 410, it is determined that a first application window has been shaken. Shaking occurs when the first application window receives greater than a threshold number of single shakes. A single shake may occur when the first application window is moved a first direction a threshold distance and then moved in a second direction the threshold distance. In one embodiment, the first application window may need to be moved greater than the threshold distance at greater than a threshold velocity for a single shake to occur. The first direction may also need to be less than a threshold angle from opposite from the second direction for a single shake to occur. In another embodiment, the first application window may need to be moved greater than the threshold distance in the first direction and then greater than the threshold distance in the second direction in less than a threshold time period. Other variations are possible. In one embodiment, the threshold number of shakes required for a first application window to be shaken is three shakes. In one embodiment, the threshold distance the first application window needs to be moved is between 1 and 2000 pixels, and the threshold velocity a first application window needs to be moved at is 600 pixels per second.

In one embodiment, the window velocity is calculated based on window movement messages received. The window velocity may be calculated based on the time stamp and window coordinates included within the message. For example, a first message may be sent at time $T_1$, and contain the coordinates of one corner of the window $X_1$ and $Y_1$. A second message may be sent at time $T_2$ and include the coordinates $X_2$ and $Y_2$. In this instance, the window velocity would be calculated by dividing the distance traveled between X1, Y1 and X2, Y2 divided by $T_2$ minus $T_1$. This calculation can be repeated with each set of window movement messages received. This is just one example of how the window velocity may be calculated. The present invention is not intended to be limited by the method used to calculate the window velocity.

At step 420, all minimizable application windows, except the first application window are minimized. At step 430, upon determining that the first application window has been shaken, an undo record is created that captures the display characteristics of each application window displayed when the first application window was shaken. Examples of display characteristics captured in the undo record include, application window Z-order, the location of each application window, and the size of each application window.

At step 440, it is determined that the first application window has been shaken a second time. In response, at step 450, all of the application windows previously minimized at step 420 are restored accJobs to the display characteristics captured in the undo record. In one embodiment, prior to restoring the application windows is first determined that a disqualification event has not occurred between the first application window being shaken the first time and the first application window being shaken a second time. Examples of disqualification events include opening a new application window after the application windows are minimized, closing the first application window, and restoring a single application window. If it is determined that a disqualification event has occurred between the first time the first application window is shaken and the second time the first application window is shaken then the second shaking may be treated as a first shaking. Thus, all minimizable application windows would be minimized upon determining that the second shaking has occurred. Similarly, an updated undo record would be created upon minimizing all minimizable application windows the second time.

Figure 5:
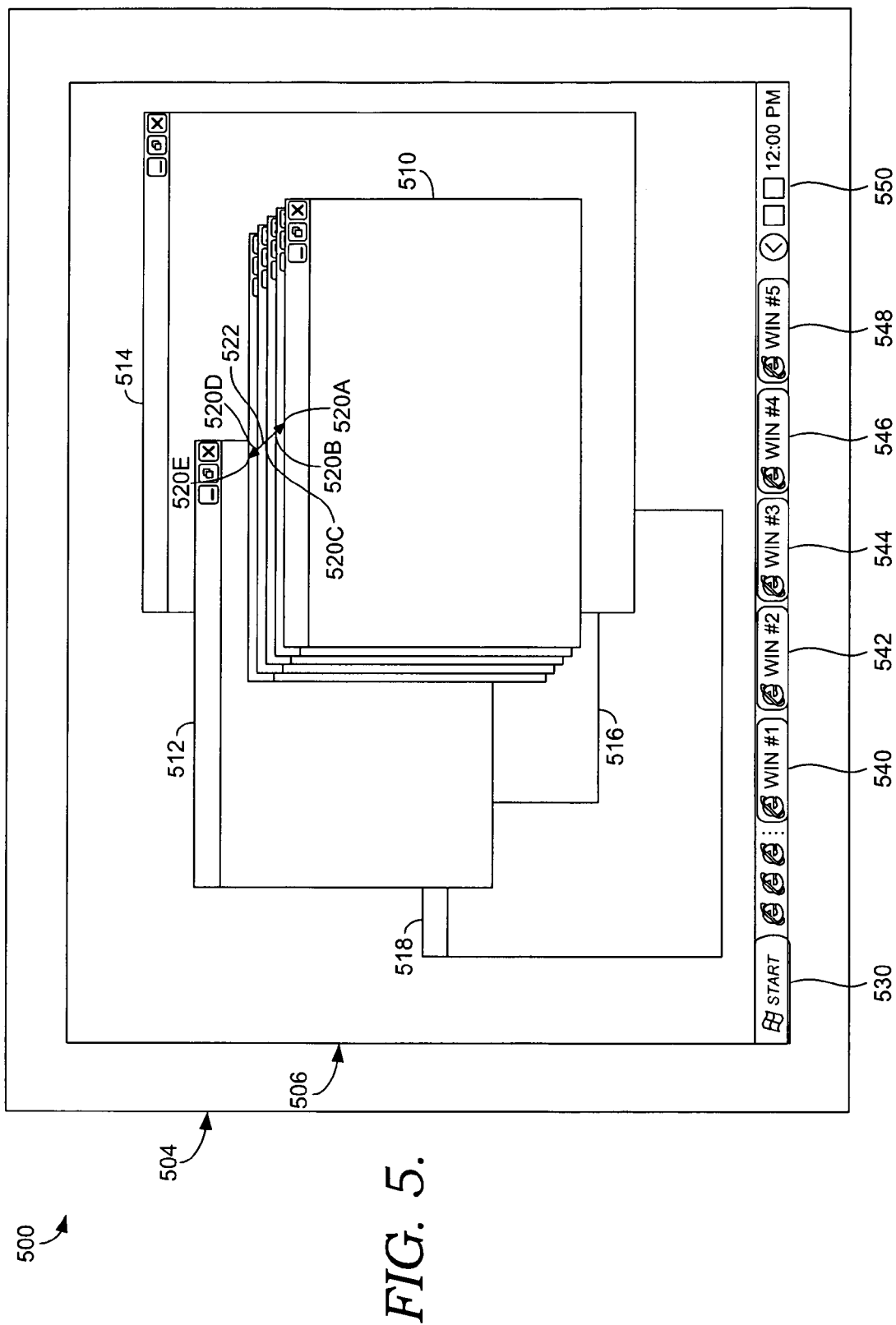
FIG. 5 is a diagram of an exemplary user interface illustrating the shaking of a target application window, in accordance with an embodiment of the present invention.

Referring next to FIG. 5, a diagram of an exemplary user interface illustrating the shaking of a target application window is shown and designated generally as user interface 500. User interface 500 includes a display device 504. The display device 504 is configured to show a graphical user interface 506. Examples of display devices that are suitable for displaying a graphical user interface 506 include, but are not limited to, a computer monitor, a projector, a television, a monitor on a laptop computer, and a display on a PDA. It should be noted that graphical user interface 506 is based on Microsoft's WINDOWS operating platform, but embodiments of the present invention are not limited to WINDOWS. Any application or operating system utilizing application windows or the equivalent thereof provides a suitable operating environment for practicing the present invention.

The graphical user interface 506 includes five application windows, namely application window 510, application window 512, application window 514, application window 516, and application window 518. Each application window has a corresponding tile along the application bar 550 located at the bottom of the graphical user interface 506. The application bar 550 includes the start button 530, tile 540, tile 542, tile 544, tile 546, and tile 548.

User interface 500 depicts the shaking of application window 510. It can be seen that application window 510 is dragged a distance illustrated by line 522. As explained previously, the distance may be determined based on the location of application window 510 at several different points in time. The initial location of application window 510 is depicted by location point 520A. Other locations of application window 510 are depicted by location point 520B, location point 520C, location point 520D, and location point 520E. In one embodiment, the location points are determined based on information contained in window movement messages. The window movement message may contain a single location point defined by x and y coordinates for an application window and the time at which the application window was located at that location point. The single location point on the application window may be a corner or any other point on the application window. The point on the application window used to describe the application window's location would be the same from movement message to movement message. As shown on user interface 500, movement of application window 510 a distance shown by line 522 may be determined based on the location of application window 510 as communicated by the location points 520A, 520B, 520C, 520D, and 520E.

The movement depicted by line 522 may be the first part of a single shake if line 522 is longer than a threshold distance. Further movement of the application window 510 in a nearly opposite direction (not shown) may complete the single shake. In one embodiment, the movement of the application window 510 must be at greater than a threshold velocity. The velocity of application window may be calculated using the location points 520A, 520B, 520C, 520D, and 520E and the corresponding time at which the application window 510 was at each location point.

Figure 6:
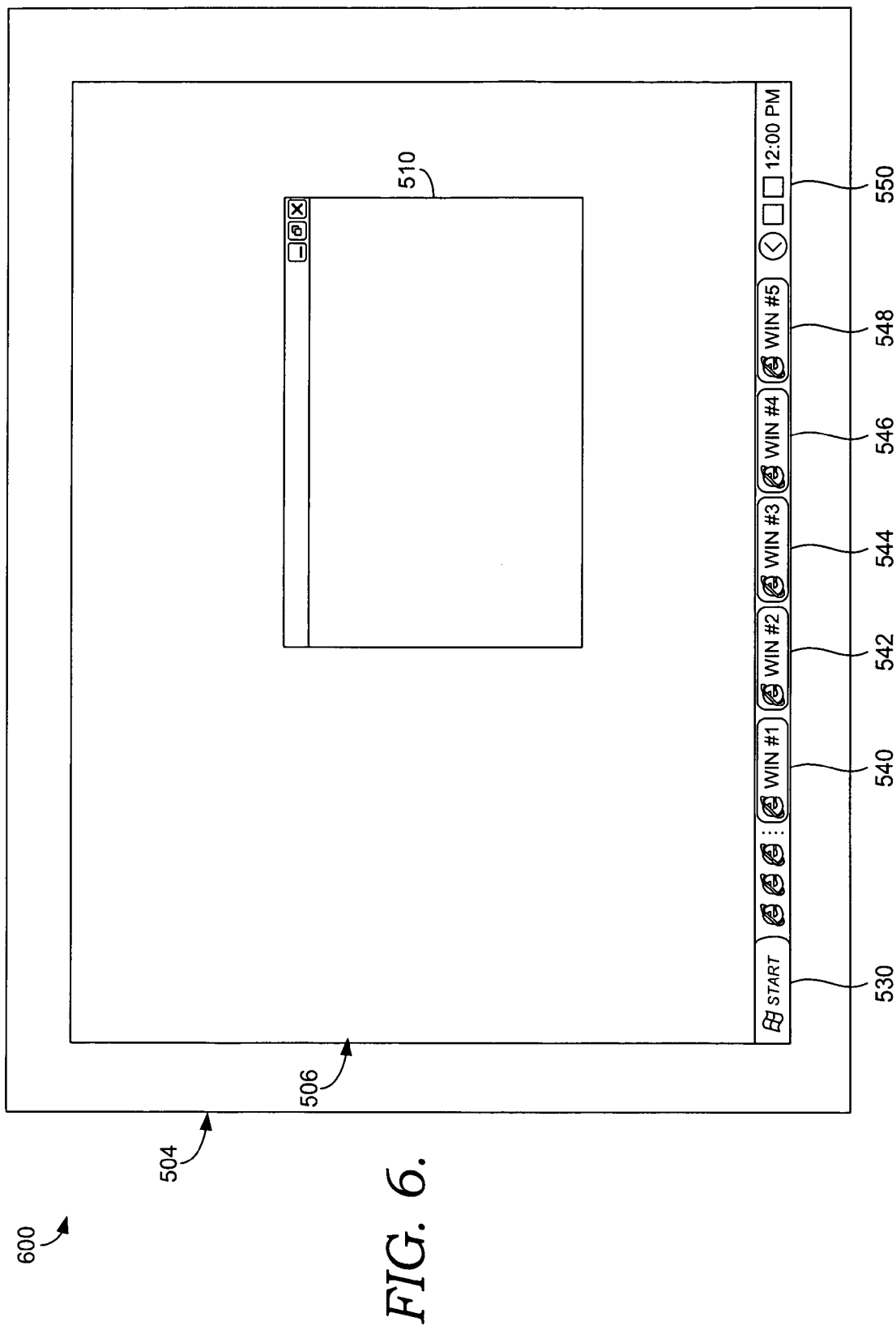
FIG. 6 is a diagram of an exemplary user interface illustrating minimizing all minimizable windows except a target window, in accordance with an embodiment of the present invention.

Turning now to FIG. 6, a diagram of an exemplary user interface illustrating minimizing all minimizable windows except a target window is shown and designated generally as user interface 600. User interface 600 includes a display device 504, and graphical user interface 506. User interface 600 shows the result of shaking application window 510 as depicted in user interface 500. It can be seen that application windows 512, 514, 516, and 518 have all been minimized and are no longer displayed on the graphical user interface 506. Only application window 510 is displayed on graphical user interface 506. The individual application windows may be restored by clicking on their corresponding tile 540, 542, 544, 546, or 548.

Figure 7:
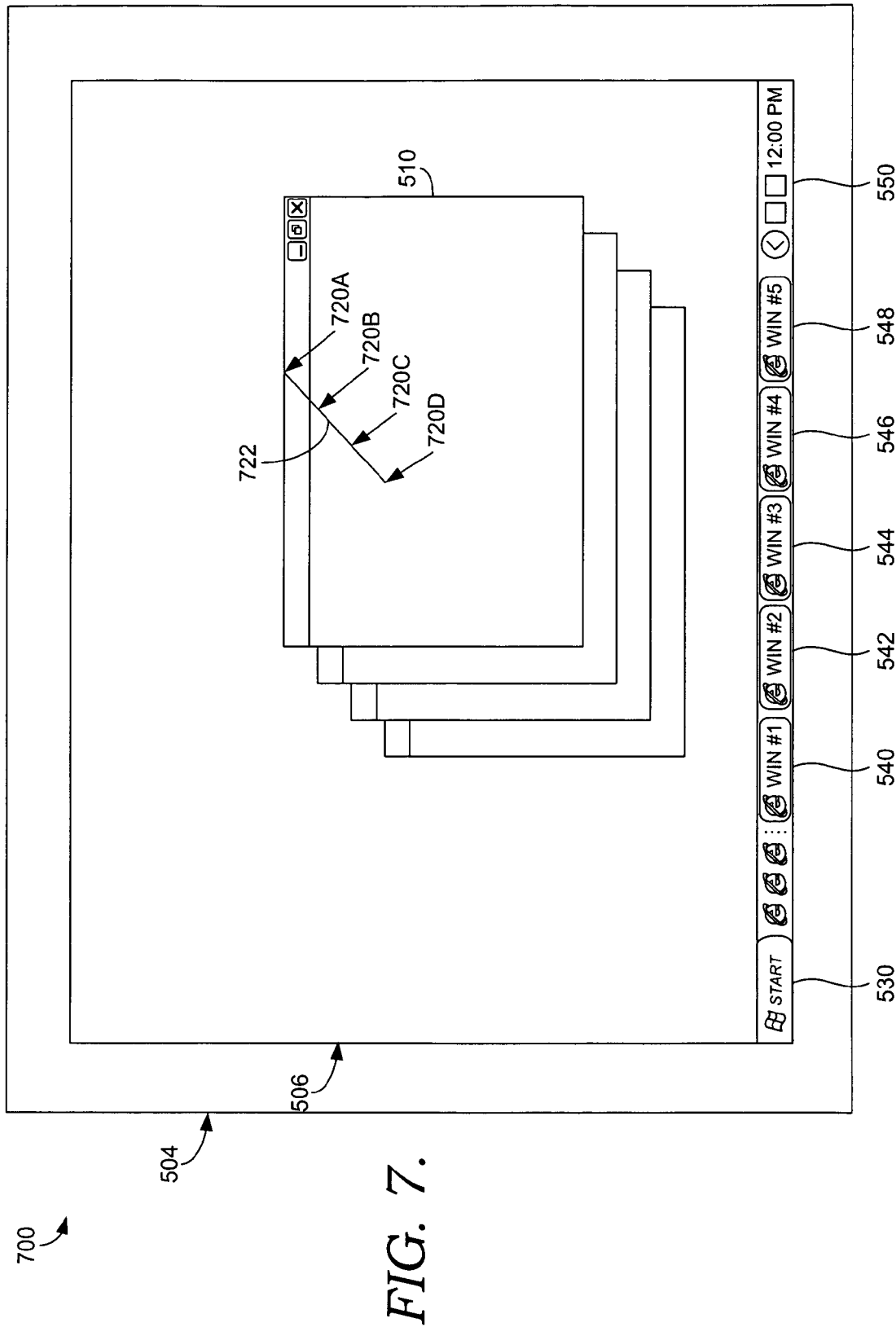
FIG. 7 is a diagram of an exemplary user interface illustrating shaking the target window after the minimizable application windows have been minimized, in accordance with an embodiment of the present invention.

Turning now to FIG. 7, a diagram of an exemplary user interface illustrating shaking the target window after the minimizable application windows have been minimized is shown and designated generally as user interface 700. User interface 700 includes a display device 504, and a graphical user interface 506. User interface 700 depicts the first movement involved in shaking application window 510 for a second time. As described previously with reference to FIG. 5, the distance traveled along line 722 by application window 510 may be determined based on location points 720A, 720B, 720C, and 720D.

Figure 8:
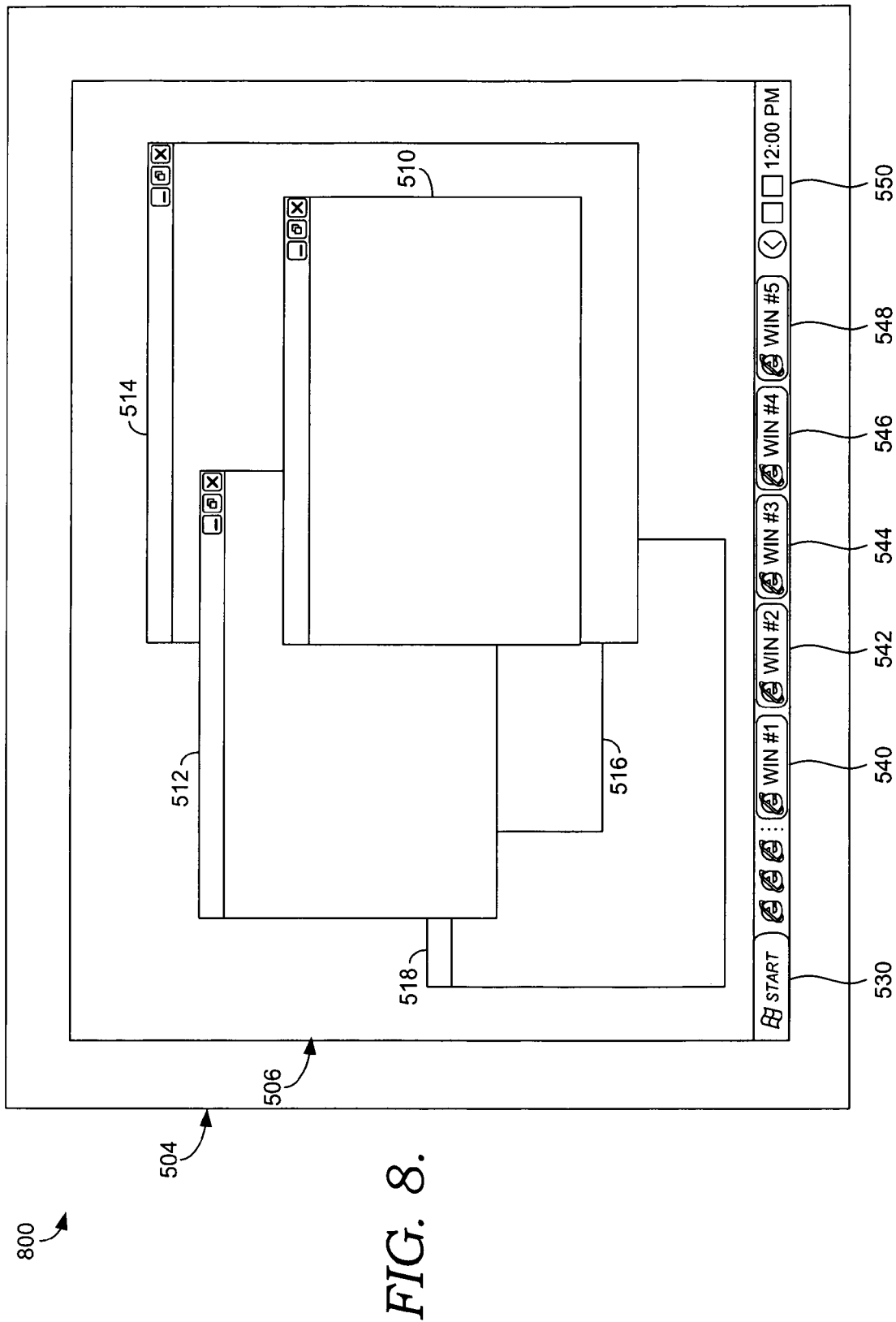
FIG. 8 is a diagram of an exemplary user interface illustrating restoring the minimized application windows in response to shaking the target application window a second time, in accordance with an embodiment of the present invention.

Referring next to FIG. 8, a diagram of an exemplary user interface illustrating restoring the minimized application windows in response to shaking the target application window a second time is shown and designated generally as user interface 800. User interface 800 includes display device 504, and graphical user interface 506. User interface 800 depicts the restoration of application windows 512, 514, 516, and 518 consistent with their size and location at the time application window 510 was shaken the first time. The restoration of application windows 512, 514, 516, and 518 may be the result of determining that application window 510 was shaken a second time as partially depicted in user interface 700.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A method in a computer system having a display device and an input device for minimizing one or more application windows displayed on the display device in response to shaking an application window, the method comprising:
    displaying on the display device two or more application windows;
    determining that a first application window was shaken, wherein the first application window is shaken when the first application window receives greater than a threshold number of single shakes, a single shake occurring when the first application window is moved a first direction either a threshold distance or at greater than a threshold velocity and then moved in a second direction either the threshold distance or at greater than the threshold velocity;
    incident to said determining, minimizing all of said two or more application windows that are minimizable except for the first application window, wherein said first application window remains displayed on the display device, and wherein a minimizable application window is any application window that is presently capable of being minimized; and
    creating an undo record that records one or more display characteristics of said two or more application windows when the all of said two or more application windows that are minimizable are minimized;
    determining that the first application window was shaken a second time; and
    restoring all of said two or more applications windows to a size and a location identical to when the first application window was shaken the first time by using the one or more display characteristics in the undo record.

2. The method of claim 1, wherein the first direction is within a threshold angle of opposite from the second direction.

3. The method of claim 1, wherein the single shake occurs when the first application window is moved the first direction the threshold distance and at greater than the threshold velocity and then moved in the second direction the threshold distance and at greater than the threshold velocity.

4. The method of claim 1, wherein the one or more display characteristics include one or more of an application window size for the two or more application windows, a Z-order for the two or more application windows, and a location of the two or more application windows.

5. One or more computer-storage media having computer-executable instructions embodied thereon for performing a method of managing application windows, the method comprising:
    determining that a first application window has been shaken a first time, wherein the first application window is shaken when the first application window receives greater than a threshold number of single shakes, wherein a single shake occurs when the first application window is moved a first direction either a threshold distance or at greater than a threshold velocity and then moved in a second direction either the threshold distance or at greater than the threshold velocity; and
    upon determining that the first application window is shaken the first time, creating an undo record that records one or more display characteristics for open application windows when the first application window is shaken;
    causing all minimizable application windows except the first application window to be minimized, wherein a minimizable application window is any window capable of minimization when the first application window is shaken;
    determining that the first application window has been shaken a second time; and
    causing all application windows to be restored to a size and a location identical to when the first application window was shaken the first time.

6. The one or more media of claim 5, wherein the method further comprises determining that a disqualification event has not occurred prior to causing the all application windows to be restored, wherein the disqualification events include one or more of closing the first application window, opening a new application window, and restoring one or more application windows.

7. The one or more media of claim 5, wherein the single shake occurs when the first application window is moved the first direction the threshold distance at greater than the threshold velocity and then moved in the second direction the threshold distance at greater than the threshold velocity.

8. The one or more media of claim 5, wherein the threshold number of single shakes is three.

9. The one or more media of claim 5, wherein the method further comprises creating an undo record that captures a size, a location, and a Z-order for open application windows when the first application window is shaken.

10. One or more computer-storage media having computer-executable instruction embodied thereon for performing a method of managing application windows, the method comprising:
- determining that a first application window has been shaken a first time, wherein the first application window is shaken when the first application window receives greater than a threshold number of single shakes, wherein a single shake occurs when the first application window is moved a first direction for a threshold distance at greater than a threshold velocity and then moved in a second direction the threshold distance at greater than the threshold velocity;
- causing each minimizable application window on a display device except the first application window to be minimized;
- upon determining that the first application window is shaken the first time, creating an undo record that records one or more display characteristics for open application windows when the first application window is shaken;
- determining that the first application window has been shaken a second time; and
- causing the open application windows to be displayed according to the one or more display characteristics captured in the undo record.

11. The one or more media of claim 10, wherein the method further includes: determining whether a disqualification event has occurred between the first application window being shaken the first time and the second time.

12. The one or more media of claim 11, wherein the method further comprises:
- upon determining that the disqualification event has occurred, causing each of the application windows displayed when the first application window is shaken the second time to be minimized except the first application window and one or more non-minimizable application windows; and
- upon determining that the first application window is shaken the second time and the disqualification event occurred, creating an updated undo record that records updated display characteristics of the each of the application windows displayed when the first application window is shaken the second time.

13. The one or more media of claim 10, wherein the method further comprises determining that a disqualification event has not occurred prior to causing the all application windows to be restored, wherein the disqualification events include one or more of closing the first application window, opening a new application window, and restoring one or more application windows.

14. The one or more media of claim 10, wherein the first application window is moved by a user grabbing the first application window with a pointing device and causing the first application window to move by moving the pointing device.

15. The one or more media of claim 14, wherein the pointing device includes one or more of a mouse, a track pad, a touch screen, a trackball, a graphics tablet with stylus, a light pen, a space ball and a pointing stick.

* * * * *